May 5, 1970   J. MARCOVECCHIO   3,509,781
LONGITUDINAL ERROR COMPENSATION APPARATUS
Filed Oct. 8, 1968   2 Sheets-Sheet 1

INVENTOR
JOSEPH MARCOVECCHIO
BY
Frederick W. Padden
ATTORNEY

DIRECTION OF MOTION

United States Patent Office 3,509,781
Patented May 5, 1970

3,509,781
LONGITUDINAL ERROR COMPENSATION APPARATUS
Joseph Marcovecchio, Berkeley Heights, N.J., assignor to Spex Industries, Incorporated, Metuchen, N.J., a corporation of New Jersey
Filed Oct. 8, 1968, Ser. No. 765,794
Int. Cl. F16h *35/06, 1/18*
U.S. Cl. 74—395                                5 Claims

ABSTRACT OF THE DISCLOSURE

The arcuate and axial rotational motions of a lead screw are made independent by longitudinal error compensation apparatus comprising a sliding rack and pinion assembly, or a belt and pulley mechanism, which compensates for spurious incremental rotations of the lead screw about its own axis. The apparatus finds particular application in the sine or cosecant drive system of a spectrometer for linear wavelength or wave number generation.

BACKGROUND OF THE INVENTION

This invention relates to arrangements employing gear devices, and their equivalent, for the compensation of longitudinal errors introduced in a lead screw and the like by the rotary motion of control elements.

In the prior art, it is often desirable to rotate a lead screw about its own axis and about an axis perpendicular thereto, under the control of gear arrangements responsive to the activation of a motor. A number of applications require precision measurement along the longitudinal dimension of the lead screw, i.e., along its principal axis. One typical application is in the field of spectroscopy where measurement precision in the order of an optical wavelength (e.g. $10^{-4}$ cm.) is essential. Heretofore, it has been a problem to provide such accuracy where the longitudinal and rotary motions of a lead screw are dependent.

One object of the present invention is to improve the accuracy of measurements made with gear arrangements heretofore subject to longitudinal errors due to dependent arcuate and axial rotational motion of a lead screw.

Another object of the invention is to improve the accuracy of measurement of a spectrometer by making independent the arcuate and axial rotational motion of a gear driven lead screw which controls the rotary position of a diffraction grating or the arcuate position of a slit or grating.

SUMMARY OF THE INVENTION

These and other objects of the invention are accomplished by longitudinal error compensation apparatus which, in an illustrative embodiment, comprises a helical drum gear slidably mounted upon the drive shaft of a motor and engaging a second helical gear mounted upon a control shaft disposed normal to the drive shaft. The motor drive is coupled to a lead screw by a mitred gear arrangement mounted upon the control shaft so that rotation of the control shaft produces rotary motion of the lead screw about both its own axis and one normal thereto.

Without more, however, longitudinal displacements or measurements along the lead screw would be subject to error as a result of spurious incremental rotation about the axis of the lead screw screw caused by arcuate motion of the screw (i.e., rotary motion of the screw about the axis of the control shaft). Error results because such arcuate motion would produce a translation of any member engaged by the lead screw (such as a nut) and hence a change in longitudinal position of any indicator responsive to the rotary motion of the screw about its own axis, as related to incremental rotations of the drive shaft.

The present invention in one illustrative embodiment compensates for such longitudinal error by means of a rack and pinion assembly in which the pinion is mounted upon the common control shaft of the helical coupling and mitre gears, and the rack is mounted upon a dovetail slide assembly whose translational motion is responsive to the arcuate motion of the lead screw. Consequently, changes in longitudinal position that would be produced by such arcuate motion are compensated for (i.e., prevented) by translational motion of the slide assembly.

BRIEF DESCRIPTION OF THE DRAWINGS

The invention, together with its various objects and features, can be easily understood from the following more detailed description taken in conjunction with the accompanying drawings in which.

DETAILED DESCRIPTION

Figure 1:
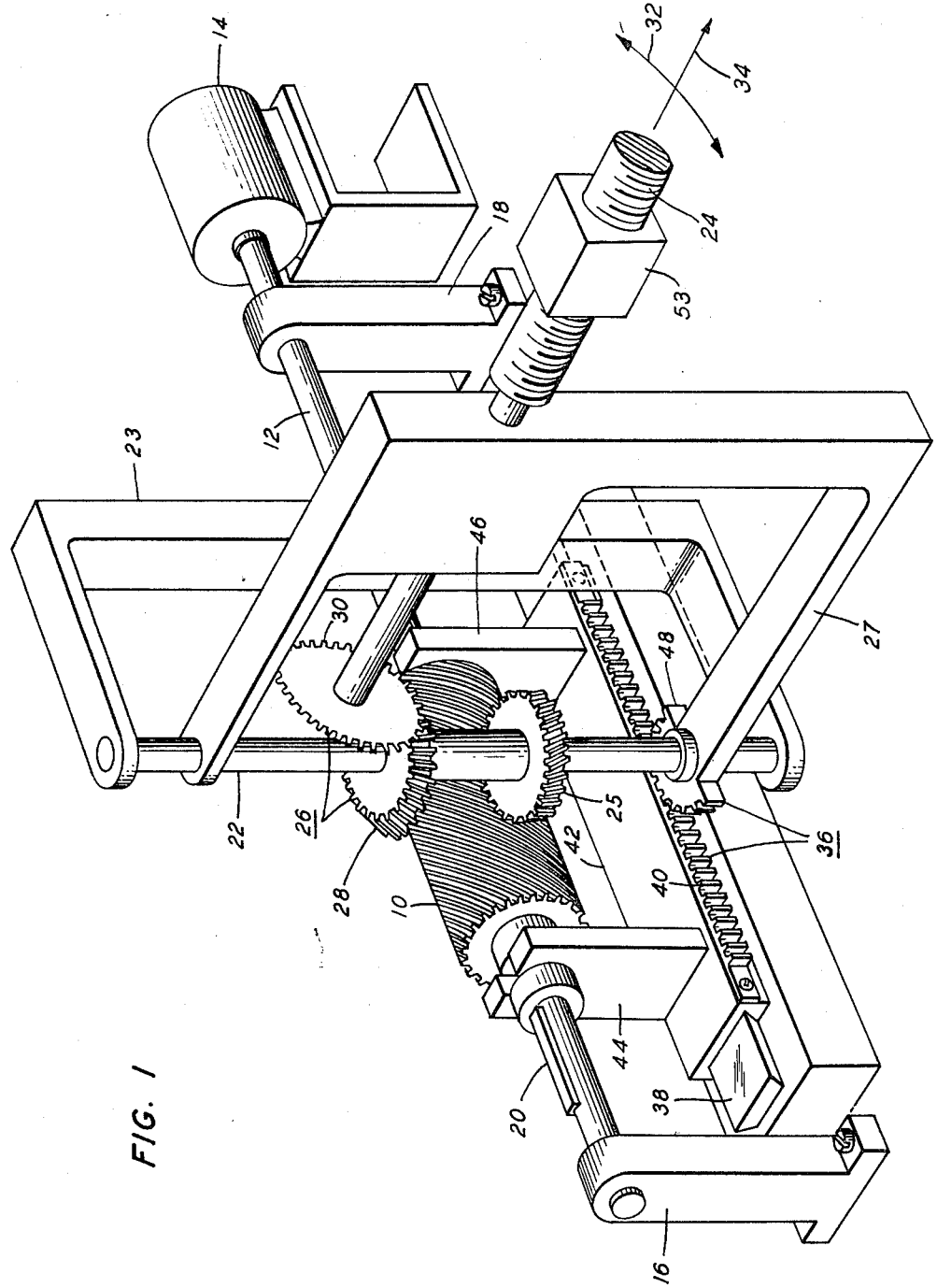
FIG. 1 is a perspective view of an illustrative embodiment of the invention.

Turning now to FIG. 1, there is shown an illustrative embodiment of a longitudinal error compensation assembly for use in gear drive lead screw apparatus comprising a helical drum gear 10, having for example a 45° pitch, coupled via drive shaft 12 to a motor 14. The drive shaft 12, which is axially mounted upon supports 16 and 18, has an elongated key 20 thereon which slidably engages an elongated complementary slot (not shown) in the drum gear 10, thus permitting simultaneous rotation and translation of the drum gear.

The rotary motion of the drum gear 10 is imparted to a control shaft 22 via a helical coupling gear 25 (also having illustratively a 45° pitch) rigidly mounted upon the shaft 22 which is rotatably supported by a U-shaped frame 23. The resultant rotary motion of shaft 22 is converted into both rotary and arcuate motion of lead screw 24 via a mitred gear assembly 26 comprising a first beveled gear 28 mounted upon the control shaft 22 and a second beveled gear 30, engaging the first and mounted axially upon lead screw 24. The lead screw, which is disposed normal to the axis of shaft 22, is supported by a yoke 27 rotatably coupled to the shaft 22.

The arcuate motion of lead screw 24, as depicted by arrows 32, results in rotary motion about axis 34 and translation of a member 53 engaging the lead screw 24, which in turn produces changes in longitudinal position of any indicator (not shown) disposed along axis 34 and responsive to the rotary motion of lead screw 24. In numerous applications, such as the cosecant drive system of a spectrometer in which the rotary position of a grating is linearly related to the rotation of the lead screw about axis 34, it is disadvantageous that incremental rotation about the lead screw axis results in longitudinal errors in measurement.

Such errors are reduced in the present invention by means of a compensation assembly 36 comprising in general a slidable mechanism coupled to the drum gear and responsive to the arcuate motion of the lead screw in such a manner as to compensate for longitudinal errors introduced by the arcuate motion. In one instance, the compensation assembly 36 comprises a dovetail slide assembly 38 having a rack gear 40 affixed to one side of a slidable block 42, the translational motion of which is coupled to drum gear 10 via vertical support members 44 and 46. The translational response of rack gear 40 is also converted into rotation of control shaft 22, and hence axial and arcuate rotation of lead screw 24, via a sector pinion 48 which cooperatively engages the rack gear and is rigidly affixed to yoke 27.

Figure 2:
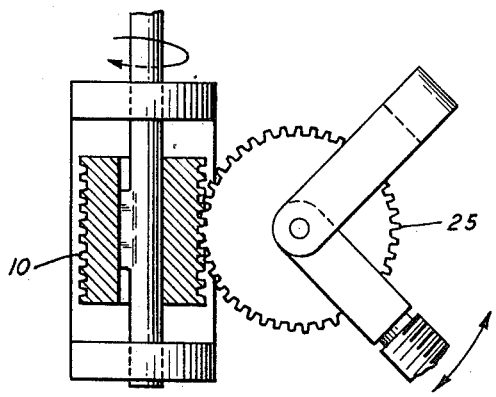
FIG. 2 is a partial top view showing the detailed cooperation of the drum and coupling gears of the compensation assembly of FIG. 1.
Figure 3:
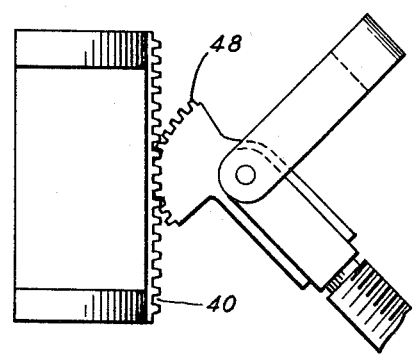
FIG. 3 is a partial top view showing the detailed cooperation of the rack and pinion of the compensation assembly of FIG. 1.

The detailed manner in which the helical drum gear 10 and the helical coupling gear 25 cooperate, and in which the rack gear 40 and the sector pinion 48 cooperate, are shown, respectively, in FIGS. 2 and 3. It should be noted that it is desirable, though not essential, that pitch diameters of the drum and coupling gears be equal.

Figure 4:
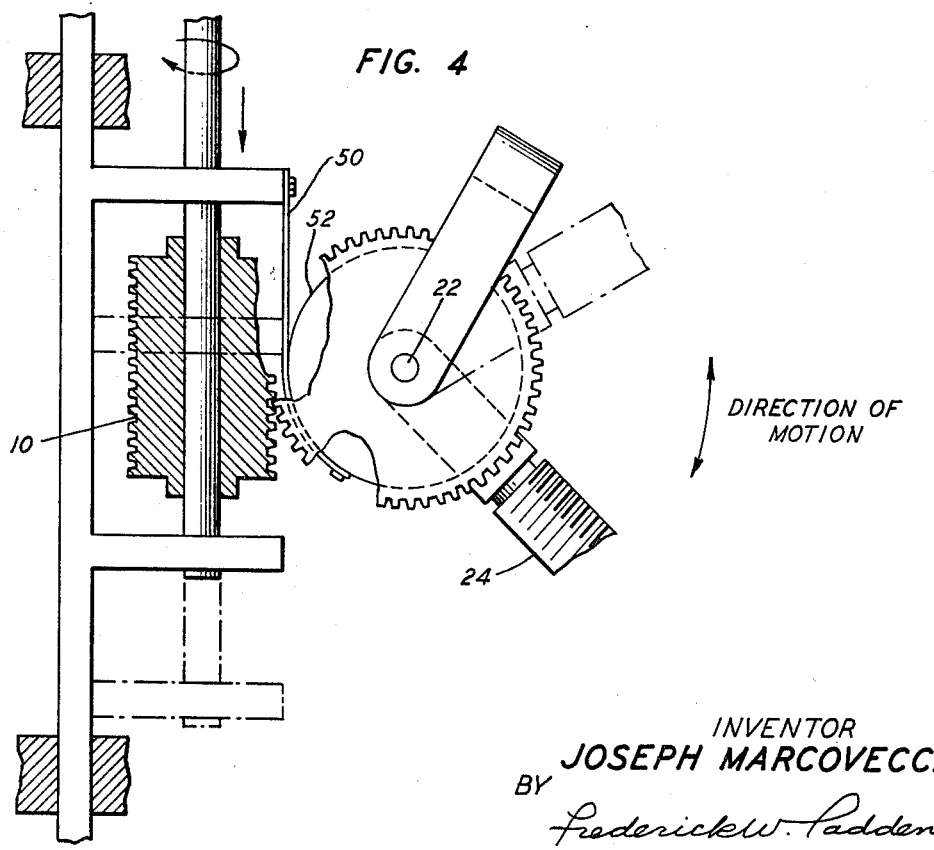
FIG. 4 is a partial top view and cuy-away view of a belt and pulley embodiment of another longitudinal error compensation assembly in accordance with the principles of the invention.

A top view of an alternative embodiment of the invention is shown in FIG. 4 in which longitudinal error compensation is provided by means of an elongated flexible member 50 (e.g., a belt or metal strip) having one end affixed to the slidable member of the dovetail assembly and its other end affixed to the circumference of a pulley 52 mounted axially upon control shaft 22. The flexible member is contiguous with a portion of the circumference of pulley 52 so that, depending upon the direction of translational motion of the dovetail assembly (or rotary motion of shaft 22), the flexible member 50 either winds upon or unwinds from pulley 52 thereby imparting thereto compensatory translational motion to reduced longitudinal errors introduced along the axial dimension of lead screw 24. Preferably the pitch diameter of the drum and coupling gears should be equal to the diameter of the pulley plus one thickness of the flexible member 50.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. For use in gear systems in which positional errors are introduced in the longitudinal displacements of a member along a lead screw responsive to the rotary motion of a drive shaft and a control shaft coupled thereto, a compensation assembly comprising
   a first gear slidably and axially mounted upon said drive shaft;
   a second gear cooperatively engaging said first gear and mounted upon a control shaft, thereby to impart rotation to said control shaft in response to rotation of said drive shaft;
   means for coupling the rotary motion of said control shaft to said lead screw thereby to impart to said screw both arcuate and axial rotary motion; and
   means for compensating for longitudinal errors in position introduced along the axis of said screw by arcuate motion thereof comprising means for converting the rotational motion of said control shaft into compensating translational motion along said drive shaft of said first gear.

2. The compensation assembly of claim 1 wherein said first gear is connected to a slidable assembly and said converting means comprises a rack gear affixed to said slidable assembly and extending along the direction of said drive shaft and a pinion gear cooperatively engaging said rack gear and affixed to said control shaft.

3. The compensation assembly of claim 1 wherein said first gear is connected to a slidable assembly, and said converting means comprises a pulley mounted on said control shaft, a flexible member connected to said slidable assembly and to the circumference of said pulley.

4. The compensation assembly of claim 3 wherein the pitch diameter of said first gear is substantially equal to the diameter of said pulley plus one thickness of said flexible member.

5. For use in gear systems in which positional errors are introduced in the longitudinal displacements of a member along a lead screw responsive to the rotary motion of a drive shaft and a control shaft coupled thereto, a compensation assembly comprising
   a helical drum gear slidably and axially mounted upon said drive shaft, said drum gear having an elongated female flat and said drive shaft having an elongated key cooperatively engaging said flat to permit both rotation of said drum gear in response to rotation of said drive shaft and translation thereon,
   a helical coupling gear mounted axially upon said control shaft and cooperatively engaging said drum gear, thereby to impart rotation to said control shaft in response to rotation of said drive shaft,
   gear means for coupling the rotary motion of said control shaft to said lead screw, thereby to impart to said lead screw both arcuate and axial rotary motion, comprising a U-shaped frame rotatably connected to said control shaft and having an elongated aperture for carrying said lead screw in a position normal to the axis of said control shaft, a first beveled gear mounted upon said control shaft, a second beveled gear mounted upon said lead screw and cooperatively engaging said first beveled gear; and
   means for compensating for longitudinal errors in position introduced along the axis of said screw by arcuate motion thereof comprising means for converting the rotational motion of said control shaft into compensating translational motion along said drive shaft of said drum gear, said converting means comprising a dovetail slide assembly having a fixed and a slidable member cooperatively engaging one another, a pair of support means connected to said slidable member and extending on either side of said drum gear so as to impart translation thereto in response to translation of said slidable member, a rack gear connected to said slidable member and extending along the direction of said drive shaft and normal to said control shaft, a pinion gear cooperatively engaging said rack gear and axially mounted upon said control shaft.

References Cited

UNITED STATES PATENTS

| 3,370,478 | 2/1968 | Martin | 74—395 |
| 3,442,593 | 5/1969 | Marcovecchio et al. | 74—424.8 X |
| 3,459,057 | 8/1969 | Bonneric | 74—89.15 |

LEONARD H. GERIN, Primary Examiner

U.S. Cl. X.R.

74—89.15. 424.8